Patented Nov. 11, 1930

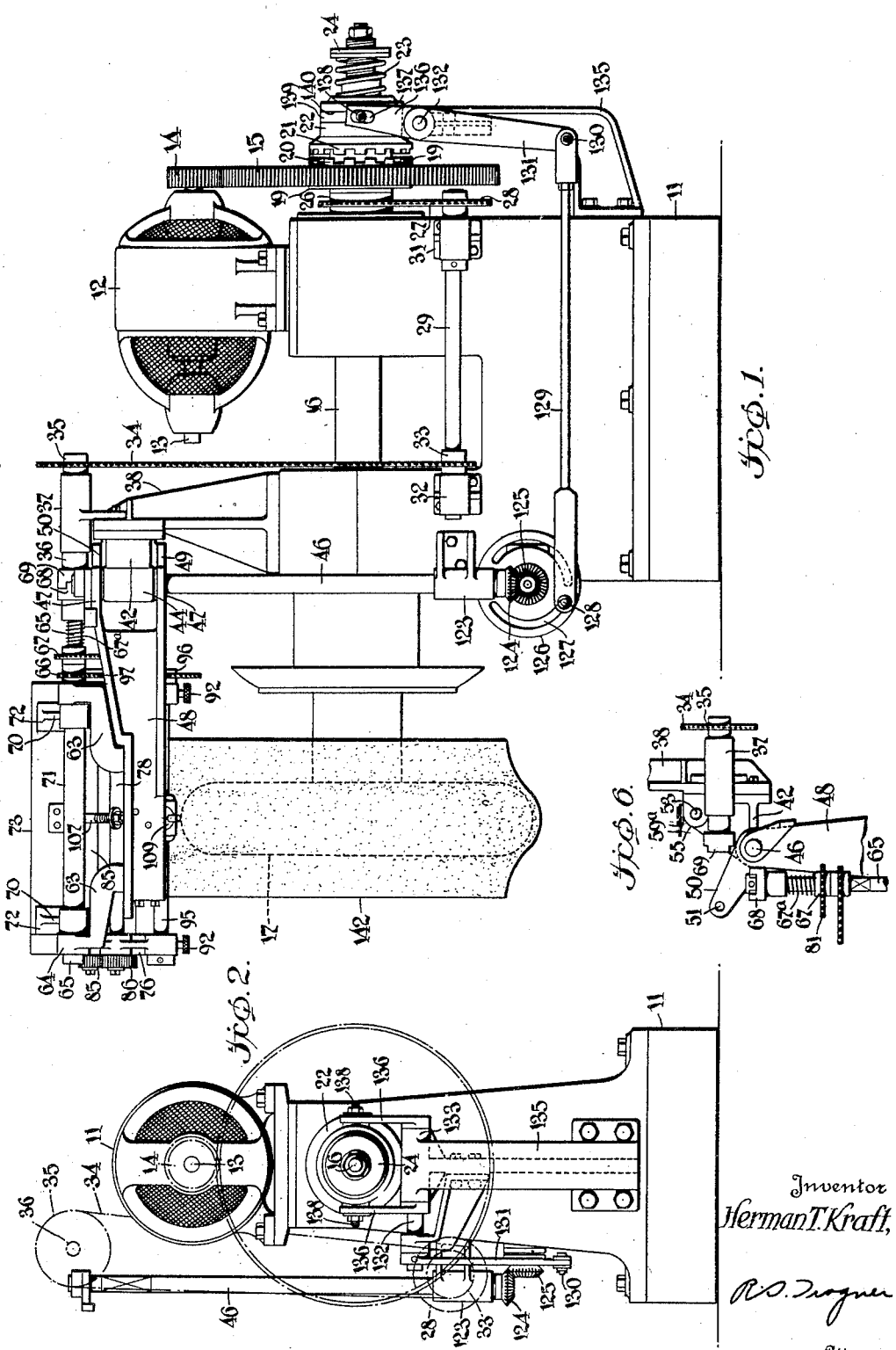

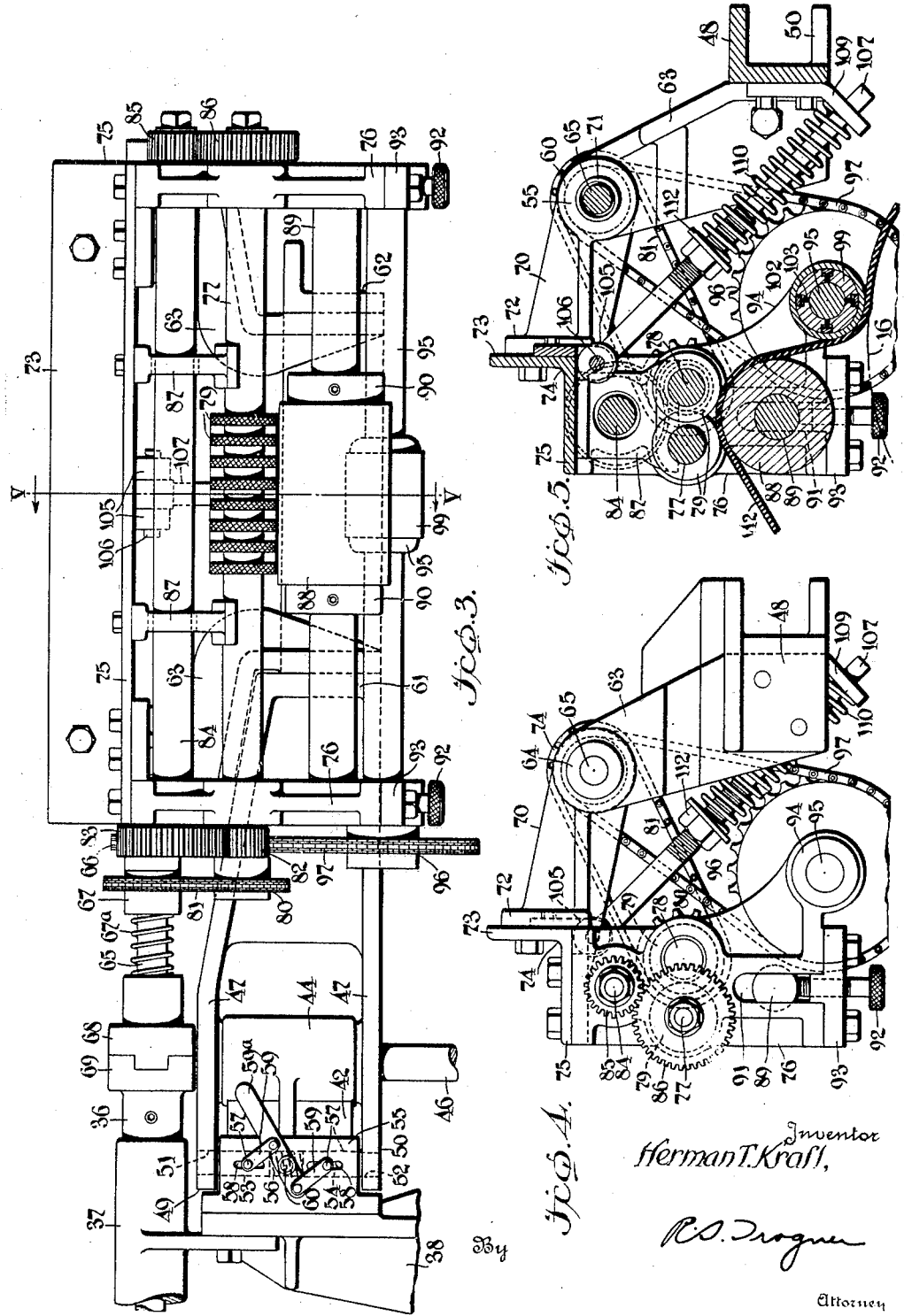

1,781,285

UNITED STATES PATENT OFFICE

HERMAN T. KRAFT, OF AKRON, OHIO, ASSIGNOR TO THE GOODYEAR TIRE & RUBBER COMPANY, OF AKRON, OHIO, A CORPORATION OF OHIO

TREAD APPLIER

Application filed December 24, 1927. Serial No. 242,500.

My invention relates to tire making machines and it has, for its primary object, the provision of a simple and efficient mechanism for applying the tread bands to the carcasses of pneumatic tires upon the cores of such machines.

More specifically, my invention has, for one of its objects, the provision of a device that is adapted to stretch the mid-portion of a tread band as it is applied to the tire carcass, in order to conform it to the contour of the latter.

Another object of my invention is to provide a tread applying mechanism that is adapted slowly to rotate the core of a tire machine while the tread band is being applied thereto.

In the manufacture of pneumatic tires, the tread ply is usually rolled out by the calendering machines in the form of a relatively long flat band or strip. According to one method of manufacturing tires, this band is then stitched to a revolving toroidal core that is adapted to shape the tire into its final configuration. Of course, when the flat band is stitched to the core, the portions that are applied to the part of the carcass adjacent the beads lie in a circle of much smaller diameter than the portions that are stitched to the outer or tread portion of the tire. It is, therefore, necessary to compress or contract the material adjacent the tire beads so that it may be brought into contact with the side of the carcass. This operation involves disadvantages such as the difficulty of uniformly positioning the tread band which frequently wrinkles adjacent the tire beads.

Another disadvantage of tire machines of the usual type lies in the fact that the core is rotated only by means of the driven shaft. These shafts are usually driven at a rate that is convenient for stitching down the various plies of the tire carcass. A velocity of rotation suitable for this purpose is much too great to permit of the application of the tread band in the same manner to align it accurately with the other portions of the tire carcass.

According to the provisions of my invention these difficulties are obviated by providing a mechanism that is designed so to stretch the mid-portion of the tread that it naturally tends to assume the same contour as the tire core to which it is applied. My improved tread applying mechanism is also provided with means whereby it is adapted to rotate the tire core at a velocity that is convenient for applying the tread band.

For a better understanding of my invention reference may now be had to the accompanying drawings, forming a part of this specification, in which;

Fig. 1 is a side elevational view of a tire machine that is equipped with my improved tread applying mechanism;

Fig. 2 is a rear end elevational view thereof;

Fig. 3 is a fragmentary side-elevational view, on a larger scale, showing the tread applying mechanism;

Fig. 4 is an end elevational view of the device illustrated by Fig. 3;

Fig. 5 is a cross-sectional view of the mechanism illustrated by Fig. 3, taken substantially along the line V—V thereof; and Fig. 6 is a fragmentary plan view showing the mechanism that connects the tread applier to the tire machine.

In practicing my invention I provide a base 11 and a driving motor 12 mounted thereon that has an axial shaft 13 for rigidly supporting a pinion 14. A bull gear 15 intermeshing with and driven by the pinion 14 is rotatably mounted upon a chuck-supporting shaft 16 adjacent the rear end thereof. A conventional tire building core 17 is mounted upon the outer end of the shaft 16. A clutch element 19 is provided in coaxial alignment upon the gear 15 and is equipped with teeth 20 intermeshing with corresponding teeth 21, upon a movable clutch element 22, which is splined to the shaft 16. The member 22 is resiliently urged toward the member 19 by means of a helical spring 23 coiled about the rear portion of the shaft 16 and engages at one end the rear of the member 22 and at the other end it engages a disc 24 screw-threaded to the shaft 16.

The opposite side of the hub of the gear 15 is provided with a sprocket gear 26 having a sprocket chain 27 trained thereabout which drives a sprocket gear 28, rigidly secured upon a horizontally disposed shaft 29. The latter member is journalled in a pair of brackets 31 and 32, which are bolted to the side of the base 11, and is provided at its forward end portion with a sprocket gear 33, similar to the gear 28. A sprocket chain 34 is trained about the gear 33 and a similar gear 35 is keyed upon a relatively short shaft 36, that is mounted in a journal element 37, secured upon an upwardly projecting bracket 38 which is bolted to the base 11. A forwardly projecting bracket 42, secured to the member 38 has a journal portion 44 that receives a vertically disposed shaft 46 to which are attached projecting arms 47 of a swingable member 48.

Angularly disposed portions 49 and 50 upon the arms 47 are provided with openings 51 and 52 registering with latch bolts 53 and 54, slidably disposed in a vertical opening formed in a projecting portion 55 of the bracket 38. A coil spring 56 disposed between the latch bolts maintains them in extended position. The bolts 53 and 54 are provided with lugs 57 disposed in slots 58 formed in the projecting portion 55 and are pivoted to links 59 which are pivotally attached to an operating handle 59ᵃ on opposite sides of the fulcrum 60 thereof.

The free end of the swinging member 48 is provided with a pair of lugs 61 and 62 to which are bolted a pair of upwardly diverging angular members 63 that are provided with journal portions 64 at their upper extremities for rotatably supporting a shaft 65 coaxially aligned with the shaft 36. The shaft 65 is provided with a pair of sprockets 66 and 67 that are positioned exteriorly of one of the journal portions 64. One end of a helical spring 67ᵃ, normally under compression, engages the sprocket 67, while the other end thereof engages a clutch jaw 68 splined to the shaft 65 and engaging a clutch jaw 69 upon the shaft 36.

A pair of arms 70 journalled upon the shaft 65 are maintained in spaced relation thereupon by a sleeve 71 positioned between them. Flanges 72 formed upon the forward ends of the arms 70 are bolted to the upright flange 73 of an angular cross bar 74 having a horizontal flange 75 to which are bolted roller supporting end members 76. A pair of tread stretching rollers 77 and 78 journalled in the end members 76 are provided with knurled intermeshing discs 79 at intermediate portions thereof. The roller 78 is provided at one end with a sprocket gear 80, connected by a sprocket chain 81 to the sprocket 67, and it is also provided upon the same end with a gear 82 meshing with a gear 83 upon one end of an idler roller 84. At its opposite end the idler roller 84 has rigidly attached thereto a gear 85 which engages and drives a gear 86 upon the roller 77. The teeth ratios of the gears just described is such that the roller 77 is driven at a somewhat slower rate of speed than the roller 78.

The rollers 77 and 78 are relatively slender and to prevent them from bending, brackets 87 are attached to the flange 75 and extend downward into contact therewith.

A presser roller 88 mounted to coact with the discs 79 upon rollers 77 and 78 is journalled upon a shaft 89 and is prevented from moving axially by means of collars 90 secured to the shaft. The ends of the shaft 89 are shaped to fit slidably within vertically disposed slots 91 and set screws 92 screw-threaded through plates 93 that are bolted to the members 76, provide for vertical adjustment of the shaft.

The end members 76 have projecting journal portions 94 in which a stitcher roller 95 is mounted, having a sprocket 96 mounted on one end thereof that is driven by means of a sprocket chain 97 trained about it, and about the sprocket 66. The stitcher roller 95 is provided at its mid-portion with an outer sleeve 99, frictionally prevented from rotating thereon by means of friction blocks 102 which are counter-sunk in the face of the roller and are outwardly pressed against the inner surface of the sleeve by means of small coil springs 103.

A pair of downwardly extending lugs 105, secured to the lower side of the horizontal portion 75 of the angle bar 74, are bored to receive a pin 106 upon which is pivoted a downwardly inclined guide rod 107, the lower end of which is slidably mounted in an opening formed in a lug 109 bolted to the swingable member 48. The rod is resiliently supported by a helical spring 110 which is confined between the lug 109 and an adjustable nut 112 screw-threaded upon the rod. The portions of the device supported by the members 70 and 76 are pivotally movable about the shaft 65. The spring 110 limits the downward pivotal movement of these portions.

The lower end portion of the vertical shaft 46 that pivotally supports the arm 48 is journalled in a bracket 123 which is bolted to the side of the base 11. A beveled gear 124 secured upon the end of a shaft 46 meshes with a corresponding beveled gear 125 which is journalled to the frame of the tire machine, and which has secured thereto a circular plate 126 having slots 127 that slidably receive a connecting pin 128 of a horizontally rearwardly extending link 129. The rear end of the latter member is connected by means of a pin 130 to a crank arm 131 whose upper end is rigidly secured to a horizontal shaft 132. The shaft is journalled in bearings 133 and 134 formed in the upper end of a bracket 135 which is bolted to the rear of the base 11. The shaft 132 has rigidly mounted thereon upwardly extending arms 136 that are slotted at their upper ends, as indicated at 137, to receive studs 138 projecting outwardly from a collar 139 which is rotatably secured within an annular channel 140 of the clutch member 22.

In the operation of the machine described, the arm 48 is first swung from the position shown by Fig. 6 to the position shown by Fig. 1, and is maintained in this position by means of the latches 53 and 54. It will be observed, that when the tread applying device is swung into operative relation the shaft 46 is rotated and thereby imparts a rotational movement to the member 126. When the latter member has rotated sufficiently far the end of the slot 127 engages the pin 128 and causes the lever 129 to be drawn forwardly and thereby to operate the crank arm 131. The latter, in turn, operates the upwardly projecting arms 136 to disengage the clutch members 19 and 20, thus permitting the bull gear 15 to rotate freely upon the shaft 16.

When the device is in this position the stitcher roller 95 engages a tire carcass built upon the core 17. The clutch portions 68 and 69 also engage each other and drive the shaft 65 which, in turn, drives the shaft 78. The shaft 77 is also caused to rotate by means of the gears 82 and 83, shaft 84 and gears 85 and 86. These elements are so constructed and arranged that the rate of rotation of the rollers 77 and 78 is not the same. A portion of tread stock 142 upon the roller 88 between the two sets of discs 79 is tensioned, causing its central portion to stretch so that it will conform to the contour of the tire core.

After the tread has been stretched, it is directed to the tire core 17 and the stitcher roller 95 stitches it to the carcass of the tire. The stitcher roller is continuously driven by means of the sprocket chain 97 and, in turn, imparts a rotational motion to the tire core 17, but owing to the ratio of the various gears that make up the kinematic train connecting the stitching roller to the sprocket 26 that is driven by the bull gear 15, the tire core is rotated at a relatively slow rate, much slower than that which is normally imparted to the tire core by means of the shaft 16. Due to this slow rate of rotation the tire tread may readily be aligned and stitched into its proper position upon the carcass.

After the tread has been stitched into position the latch mechanism is disengaged and the stitcher device is swung back to the position shown by Fig. 6 and is held in this position by engagement of the upper latch bolt 53 with the arm 49. During the swinging movement the shaft is rotated in such direction that the link 129 is forced rearwardly so that the clutch members 19 and 20 are again intermeshed and the shaft 16 is driven by the bull gear 15. The tread band may now be stitched down to the tire carcass in the usual manner.

It will be apparent from the foregoing description that I have provided a tread applying mechanism that is relatively simple in its construction and which is adapted so to shape the treads of tire cores that they readily conform to the core.

Although I have illustrated but one form which my invention may assume and described in detail but a single application thereof, it will be apparent to those skilled in the art that it is not so limited but that various minor modifications may be made therein without departing from the spirit of my invention or from the scope of the appended claims.

What I claim is:

1. A tire tread shaping device comprising a pair of parallel rollers, a third roller juxtapositioned thereto with its surface adapted to engage the surfaces of the first mentioned rollers and means for driving the first mentioned rollers at differential rates of speed, whereby tread bands which pass between the two sets of rollers will be stretched in their mid portions so that they will conform to the contour of a tire.

2. A tread applying mechanism comprising a pair of tread stretching rollers having intermeshed discs rigidly secured thereon and adapted to engage one side of a tread band, a third roller positioned in parallel relation with respect to the first mentioned rollers and adapted to engage the other surface of the tread band and press it against the surfaces of the discs and means connected to the first mentioned rollers to drive them at differential rates of speed.

3. A tread applying device comprising a pair of stretching rollers provided with intermeshed discs, a pressure roller adapted to maintain a tread band in contact with the intermeshed discs, means for driving the stretching rollers at differential rates of speed, a stitching roller positioned adjacent the latter rollers and adapted to press the tread band against a tire core, and means for positively driving the stitching roller.

4. A tread applying device comprising a horizontal swinging arm, roller supports pivotally attached to the arm, tread stretching rollers journalled to the roller support, a pressure roller journalled to the support and adapted to hold a tread band in contact with the stretching rollers, a stitching roller secured to the support and adapted to contact with a tire core and means resiliently connecting said arm to the roller support whereby to maintain the stitching roller in resilient contact with the tire core.

5. The combination with a tire machine having a frame and a rotatable tire core mounted therein, of a bracket secured to the frame, a shaft having a clutch jaw secured to the bracket, a swingable arm secured to the bracket, a shaft mounted on the arm and having a second clutch jaw mounted thereon adapted to engage the first mentioned clutch jaw and a stitching roller geared to the latter shaft.

6. The combination with a tire machine having a frame and a rotatable tire core mounted therein, of a bracket secured to the frame, a shaft having a clutch jaw secured to the bracket, a swingable arm secured to the bracket, a shaft mounted on the arm and having a clutch jaw mounted thereon adapted to engage the first mentioned clutch jaw and stretching rollers geared to the latter shaft.

7. The combination with a tire machine having a frame and a rotatable tire core mounted therein, of a bracket secured to the frame, a shaft having a clutch jaw secured to the bracket, a swingable arm secured to the bracket, a shaft mounted on the arm and having a clutch jaw mounted thereon adapted to engage the first mentioned clutch jaw and stitching rollers and stretching rollers geared to the latter shaft.

8. The combination with a tire machine having a base, a motor mounted on the base, a shaft journalled in the base, driving means interconnecting the shaft and the motor, and a tire core mounted on the shaft, of a tread applying mechanism positioned adjacent the core, and having a driving connection with the motor, and a clutch mechanism associated with the shaft and the motor, whereby the shaft may be disengaged from driving connection with the motor while the tread applying mechanism is being driven.

9. The combination with a tire machine having a base, a motor mounted thereon, a shaft journalled in the base, driving means interconnecting the motor and the shaft, and a tire core mounted upon the shaft, of a clutch associated with the driving means, whereby the motor and the shaft may be disengaged from driving connection, a tread applying mechanism associated with the core and having tread applying rollers and a driving mechanism connected to the rollers and a clutch associated therewith, whereby the shaft and the rollers may be rotated independently of each other.

10. The combination with a tire machine having a base, a motor mounted thereon, a shaft journalled in the base, driving means interconnecting the motor and the shaft, and a tire core mounted upon the shaft, of a clutch associated with the driving means, whereby the motor and the shaft may be disenaged from the driving means, a tread applying mechanism associated with the core and having tread applying rollers, a driving mechansim connected to the rollers, and a clutch associated therewith, whereby the shaft and the rollers may be rotated independently of each other and means interconnecting the two clutch mechanisms whereby when one is moved to inoperative position the other will be moved to operative position.

11. The combination with a tire machine having a base, a shaft mounted in the base, means for rotating the shaft, and means for interrupting the rotative movement thereof and a tire building core mounted upon the shaft, of a tread applying mechanism positioned adjacent the core comprising tread applying rollers mounted therein, means for rotating the rollers, and means included in the mechanism operative by movement thereof for interrupting the rotation of the rollers.

12. The combination with a tire machine having a base, a rotatably driven shaft mounted in the base, means for interrupting the rotation of the shaft and a tire core mounted upon the shaft, of a tread applying mechanism positioned adjacent the core comprising a tread applying roller mounted therein having means for moving it against the core, means for rotating the roller, means for interrupting the rotative movement thereof, and means interconnecting the means for interrupting the rotative movement of the shaft and the tread applying roller, whereby the shaft may be driven by either the first mentioned means or the second mentioned means.

13. The combination with a tire machine having a base, a driving motor mounted thereon, a shaft having a tire building core thereon journalled in the base and driving means connecting the motor and the shaft, of a clutch mechanism associated with the driving means whereby the latter may be disengaged from driving connection with the shaft, an arm hinged to the base, rollers rotatably mounted upon the arm, a driving connection between the rollers and the driving means, a second clutch associated with the driving connection and means interconnecting the clutches for simultaneously actuating them.

14. A machine for constructing pneumatic tires comprising a base, a rotatable toroidal core attached to the base, a stitching roller secured to the base and contacting with the outer periphery of the core for stitching units of tire material to the core, stretching rollers disposed adjacent the stitcher roller for stretching the mid portions of the units, the stretching rollers being so disposed as to direct the units between the stitching roller and toroidal core, means for driving the toroidal core and means for driving the stitcher rollers, the two means being operable independently of each other selectively to drive either the roller or the core.

In witness whereof, I have hereunto signed my name.

Signed at Akron, in the county of Summit, and State of Ohio, this 23rd day of December, 1927.

HERMAN T. KRAFT.